(12) United States Patent
Shiomi et al.

(10) Patent No.: US 7,281,136 B2
(45) Date of Patent: Oct. 9, 2007

(54) LSI DESIGN METHOD AND VERIFICATION METHOD

(75) Inventors: Kentaro Shiomi, Osaka (JP); Akira Motohara, Hyogo (JP); Makoto Fujiwara, Kyoto (JP); Toshiyuki Yokoyama, Kyoto (JP); Katsuya Fujimura, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 902 days.

(21) Appl. No.: 09/779,440

(22) Filed: Feb. 9, 2001

(65) Prior Publication Data

US 2002/0083330 A1 Jun. 27, 2002

(30) Foreign Application Priority Data

Feb. 14, 2000 (JP) ............................. 2000-034577

(51) Int. Cl.
*G06F 12/14* (2006.01)
*G06F 17/50* (2006.01)

(52) U.S. Cl. .................. 713/189; 713/187; 713/190; 703/13; 703/15; 716/4

(58) Field of Classification Search ................. 703/13, 703/15; 713/189, 190, 187; 716/4; 326/8
See application file for complete search history.

(56) References Cited

U.S. PATENT DOCUMENTS

| | | | | |
|---|---|---|---|---|
| 4,583,011 A | * | 4/1986 | Pechar | ............................ 326/8 |
| 5,014,311 A | | 5/1991 | Schrenk | |
| 5,748,741 A | * | 5/1998 | Johnson et al. | ................ 380/28 |
| 6,006,328 A | | 12/1999 | Drake | |
| 6,088,452 A | * | 7/2000 | Johnson et al. | ................ 380/28 |
| 6,137,318 A | * | 10/2000 | Takaaki | ....................... 326/112 |
| 6,157,947 A | | 12/2000 | Watanabe et al. | |
| 6,490,646 B1 | * | 12/2002 | Leydier | ....................... 710/301 |

FOREIGN PATENT DOCUMENTS

| | | |
|---|---|---|
| JP | 05-128197 | 5/1995 |
| JP | 10-198726 A | 7/1998 |
| JP | 10-312311 | 11/1998 |

(Continued)

OTHER PUBLICATIONS

Collberg et al.; "Manufacturing Cheap, Resilient, and Stealthy Opaque Constructs"; Jan. 1998; Annual Symposium on Principles of Programming Languages; pp. 184-196, http://citeseer.ist.psu.edu/collberg98manufacturing.html.*

(Continued)

*Primary Examiner*—Kambiz Zand
*Assistant Examiner*—Jung Kim
(74) *Attorney, Agent, or Firm*—McDermott Will & Emery LLP

(57) ABSTRACT

An encryption process is employed in the LSI design so as to improve confidentiality of the circuit design data over conventional examples. In the encryption process, confidential circuit design data is encrypted to produce encrypted design data and a cipher key. The encrypted design data is provided to the user who conducts a design/verification process. The key is also provided as required. In the design/verification process, the encrypted design data is subjected to various processes without disclosing the contents of the original circuit. In a decoding process, the encrypted design data subjected to the design/verification process is decoded to produce original circuit design data.

6 Claims, 16 Drawing Sheets

FOREIGN PATENT DOCUMENTS

| | | | |
|---|---|---|---|
| JP | 11-224284 | 8/1999 | |
| WO | WO9901815 | * 6/1997 | ................ 713/194 |

OTHER PUBLICATIONS

Curtis, Kevin, "No Spread of IP core with no Intellectual property protection." NIKKEI Electronics, Nikkei BP, No. 717, pp. 169-173, Jun. 1, 1998.

Yoshimori et al., "VSI Alliance and Technologies for IP Core Appllcation." Toshiba Review, Toshiba Corporation, pp. 27-30, vol. 52, No. 12, Dec. 1, 1997 with partial English Translation thereof.

Curtis, Kevin. "Core Proliferation: Security and Protection Issues with IP Integration." Electronic Design, pp. 108-112, Jan. 12, 1998.

Kojima, I. "EDA Aiming at Verification, Rapid Response to System LSI" Nikkei Electronics, Nikkei Business Publication Inc., Aug. 10, 1998, No. 723, pp. 99-109.

Narita et al., "Board Level Simulation with R4400 Model," Study Report in Information Processing Society of Japan, Dec. 1995, pp. 77-84, vol. No. 119(DA-78).

Takayama et al., "A High Speed Logic Verification System of Large Scale Digital Designs," Research Report of Information Processing Society of Japan, Jan. 1995, pp. 9-16, vol. 95, No. 6(DA-73).

Notice of Reasons for Rejection Issued by Japanese Patent Office (Translation).

* cited by examiner

FIG. 2B  B 1 process of directly processing encrypted data

FIG. 2C  B 2 data conversion conducted with ciphers maintained

ORIGINAL CIRCUIT
$f_0$

DUMMY CIRCUIT
$f_1$

KEY=(0, 1)

| X | NUMBER OF TIMES A CHANGES | B | OUTPUT | |
|---|---|---|---|---|
| 0 | 1 | 0 | 0 | OK |
|   |   | 1 | 1 |    |
| 0 | 2 | 0 | 0 | OK |
|   |   | 1 | 1 |    |
|   | ⋮ |   | ⋮ |    |
| 0 | 7 | 0 | 0 | OK |
|   |   | 1 | 1 |    |
| 0 | 8 | 0 | 0 | NG |
|   |   | 1 | 0 |    |
| 0 | 9 | 0 | 0 | NG |
|   |   | 1 | 0 |    |
|   | ⋮ |   | ⋮ |    |

| X | Y | A | B | C | OUTPUT | |
|---|---|---|---|---|--------|---|
| 0 | ⌐⌐ | 0 | 0 | 0 | 0 | OK |
|   |   | 0 | 0 | 1 | 1 |    |
|   |   | 0 | 1 | 0 | 0 |    |
|   |   | 0 | 1 | 1 | 0 |    |
|   |   | 1 | 0 | 0 | 0 |    |
|   |   | 1 | 0 | 1 | 0 | NG |
|   |   | 1 | 1 | 0 | 0 |    |
|   |   | 1 | 1 | 1 | 0 |    |

LSI DESIGN METHOD AND VERIFICATION METHOD

BACKGROUND OF THE INVENTION

The present invention generally relates to design and verification of LSIs (large-scale integrated circuits). More particularly, the present invention relates to a technology for maintaining confidentiality of design data.

In the LSI design, confidentiality of the contents of the circuit should sometimes be maintained. For example, in the LSI involved in data encryption, the encryption logic may possibly be decrypted if the contents of the circuit are known.

Conventionally, an LSI requiring such preservation of confidentiality has been designed by a limited person(s) and/or at a specific location(s) so as to prevent the contents of the circuit from being known to other people.

With recent increased complication and scale of the LSIS, many designers are engaged in the design of a single LSI. Accordingly, designing the LSI by a limited designer(s) and/or at a limited location(s) is not always enough to maintain confidentiality of the circuit.

SUMMARY OF THE INVENTION

It is an object of the present invention to improve confidentiality of the circuit design data over conventional examples by employing encryption in the LSI design.

It is another object of the present invention to enable encrypted design data to be verified while maintaining confidentiality thereof.

Specifically, a method for designing an LSI according to the present invention includes the step of encrypting provided circuit design data.

In the method for designing an LSI according to the present invention, the encrypting step includes the step of conducting circuit conversion to produce an encrypted circuit, the circuit conversion being conducted using an entire circuit represented by the circuit design data or a part of the circuit as an original circuit. Preferably, the circuit conversion step includes the steps of providing at least one dummy circuit in parallel with the original circuit, the dummy circuit having a same number of inputs and a same number of outputs as those of the original circuit, providing a permutation circuit for permutating respective outputs of the original circuit and the dummy circuit, and providing a selector responsive to a selection signal for selecting a number of signals corresponding to the number of outputs of the original circuit from an output of the permutation circuit so as to produce the encrypted circuit, wherein the selection signal is preferably used as a key signal, and such a value of the key signal that the output of the original circuit matches an output of the selector is preferably used as a key of the encrypted circuit.

Preferably, the encrypting step includes the step of producing the dummy circuit to be used in the circuit conversion step, and the dummy circuit producing step includes the steps of producing a dummy logic database for the original circuit according to a conversion rule, the dummy logic database including candidate dummy circuits, and selecting the dummy circuit from the dummy logic database according to an output rule. The conversion rule preferably includes at least one of inversion of a logic value, conversion of a logic operator, and permutation of logic operators. Preferably, the output rule is random selection.

Preferably, the method further includes the step of conducting layout of the encrypted circuit, and the layout step includes the step of conducting the layout such that an input signal line of the key signal can be connected to either one of a power supply and a ground. Preferably, the layout step includes the step of connecting the key signal to one of the power supply and the ground according to the key so as to produce layout of the original circuit.

Specifically, a method for verifying an LSI according to the present invention includes the step of verifying a circuit operation for circuit design data encrypted together with a reference operation model, and the verifying step includes the steps of decoding the encrypted circuit design data into actual design data and the reference operation model, conducting simulation for the actual design data to obtain an actual output value, conducting simulation for the reference operation model to obtain an expected output value, and comparing the actual output value with the expected output value to output a comparison result.

Specifically, a method for verifying an LSI according to the present invention includes the step of verifying a circuit operation for circuit design data encrypted together with protocol definition, and the verifying step includes the steps of decoding the encrypted circuit design data into actual design data and the protocol definition, conducting simulation for the actual design data to obtain an actual output value, and comparing the actual output value with the protocol definition to output a comparison result.

Specifically, a method for verifying an LSI according to the present invention includes the step of verifying encrypted circuit design data by simulation, wherein the verifying step limits the simulation conducted by unauthorized access.

Preferably, the verifying step includes the steps of decoding the encrypted circuit design data into actual design data, conducting simulation for the actual design data, counting prescribed limitation information in the simulation, and limiting the simulation when a count value exceeds an upper limit. The prescribed limitation information preferably includes at least one of an execution step of the simulation, execution time of the simulation, a number of toggles of a specific signal within a circuit, and combination of inputs to the circuit. Preferably, the prescribed limitation information is randomly selected.

Preferably, the verifying step includes the steps of decoding the encrypted circuit design data into actual design data, conducting simulation for the actual design data, checking in the simulation whether a prescribed protocol restriction condition is violated or not, and limiting the simulation if the prescribed protocol restriction condition is violated. The prescribed protocol restriction condition preferably includes at least one of an input protocol and an in-operation protocol. Preferably, the prescribed protocol restriction condition is randomly selected.

In the method for verifying an LSI according to the present invention, the limitation preferably includes at least one of: discontinuing the simulation, reducing a simulation execution speed, and executing the simulation in an abnormal manner; outputting no simulation result; and producing no data or key to be passed to a following step.

Specifically, a method for verifying an LSI according to the present invention includes the steps of: encrypting circuit design data including a check circuit for checking for unauthorized access in simulation; and verifying the encrypted circuit design data by simulation, wherein the verifying step operates the check circuit so as to limit the simulation conducted by unauthorized access.

Preferably, the check circuit checks in the simulation whether a count value of prescribed limitation information exceeds an upper limit or not. Preferably, the check circuit checks in the simulation whether a protocol restriction condition is violated or not.

Specifically, a method for designing an LSI according to the present invention includes the steps of: extracting timing information from provided circuit design data; converting the circuit design data into encrypted design data according to a prescribed conversion rule so as to match only the extracted timing information, and adding a buffer to at least one logic gate; adjusting a size of the added buffer for the encrypted design data; and by using the prescribed conversion rule as a key, decoding the encrypted design data subjected to the adjustment of the buffer size.

Specifically, a method for designing an LSI according to the present invention includes the step of decoding circuit design data encrypted together with a circuit for determining a unique ID into actual design data and the unique-ID determination circuit, and the step includes the step of defining a correct value in the unique-ID determination circuit by using an input unique parameter.

BRIEF DESCRIPTION OF THE DRAWINGS

FIGS. 2A to 2D are diagrams each showing a basic process pattern in the circuit design style of FIG. 1.

DETAILED DESCRIPTION OF THE INVENTION

Figure 1:
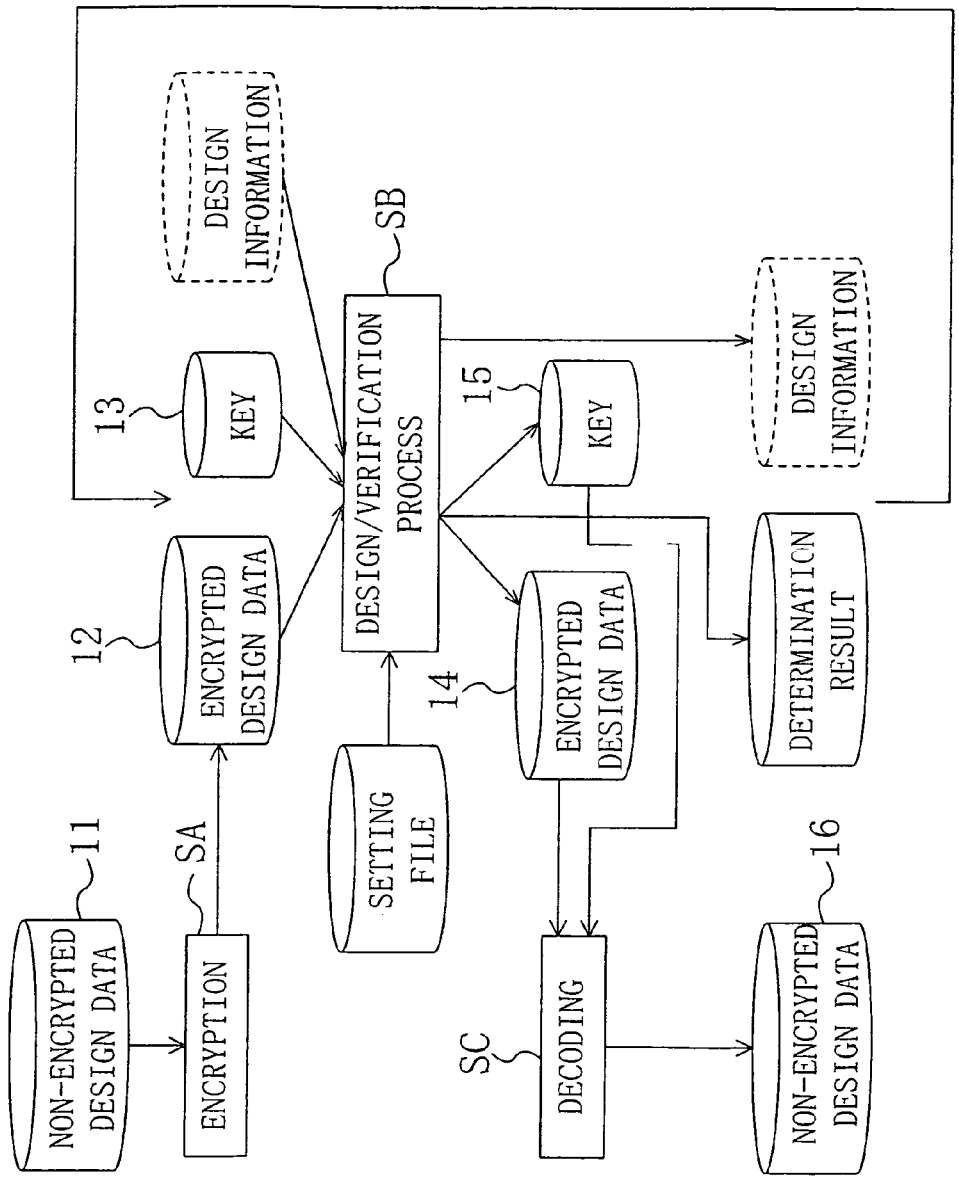
FIG. 1 is a diagram showing a circuit design style proposed by the inventor of the present application.

FIG. 1 is a diagram showing a circuit design style proposed by the inventor of the present application. In the design style shown in FIG. 1, an encryption process SA and a decoding process SC of the design data are conducted so that a design/verification process SB can be conducted even if the contents of the confidential design data are not seen.

In the encryption process SA, confidential circuit design data 11 is encrypted to produce encrypted design data 12 and a cipher key 13. The encrypted design data 12 is provided to the user who conducts the design/verification process SB. The key 13 is also provided as required by the design/verification process SB.

In the design/verification process SB, the encrypted design data 12 is subjected to various processes without disclosing the contents of the original circuit. In the decoding process SC, encrypted design data 14 subjected to the design/verification process SB is decoded with a key 15 to produce original circuit design data 16.

Figure 2A:
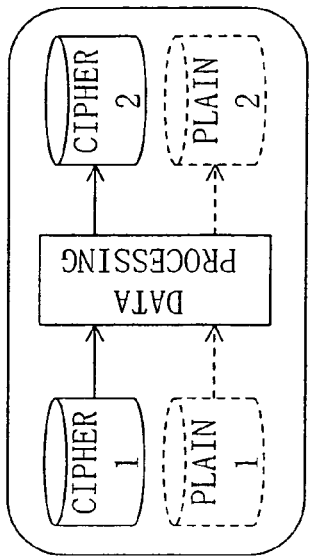
Figure 2D:
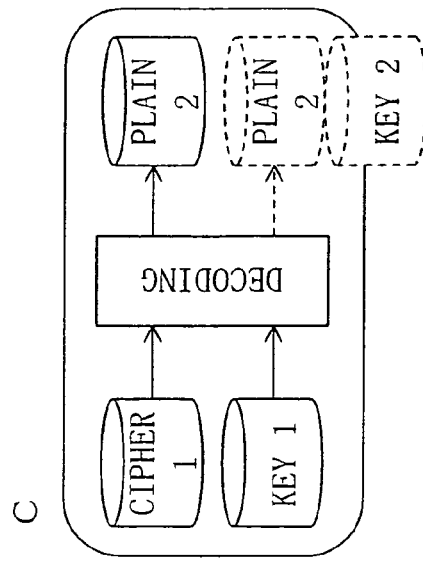
Figure 2D:
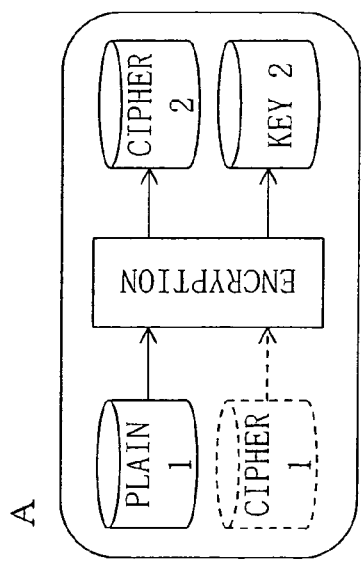
Figure 2D:
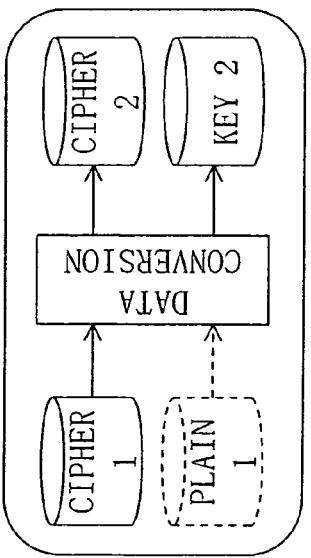

FIGS. 2A to 2D are diagrams each showing a basic process pattern in the circuit design style of FIG. 1. FIG. 2A shows encryption A, FIG. 2B shows a process B1 of directly processing the encrypted data, FIG. 2C shows data conversion B2 conducted with ciphers maintained, and FIG. 2D shows decoding C. The processes B1 and B2 are different from each other in that the process B1 neither involves decoding and encryption nor produces an additional key, whereas the process B2 produces additional encrypted data together with an additional key.

Figure 3A:
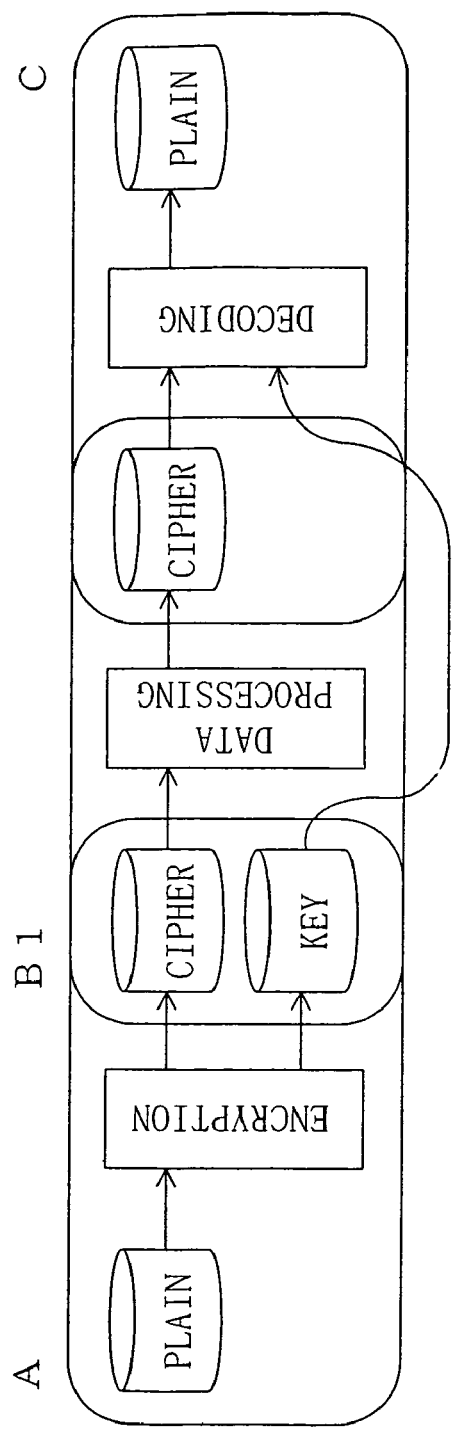
FIGS. 3A and 3B are diagrams each showing a process flow according to the present invention.
Figure 3B:
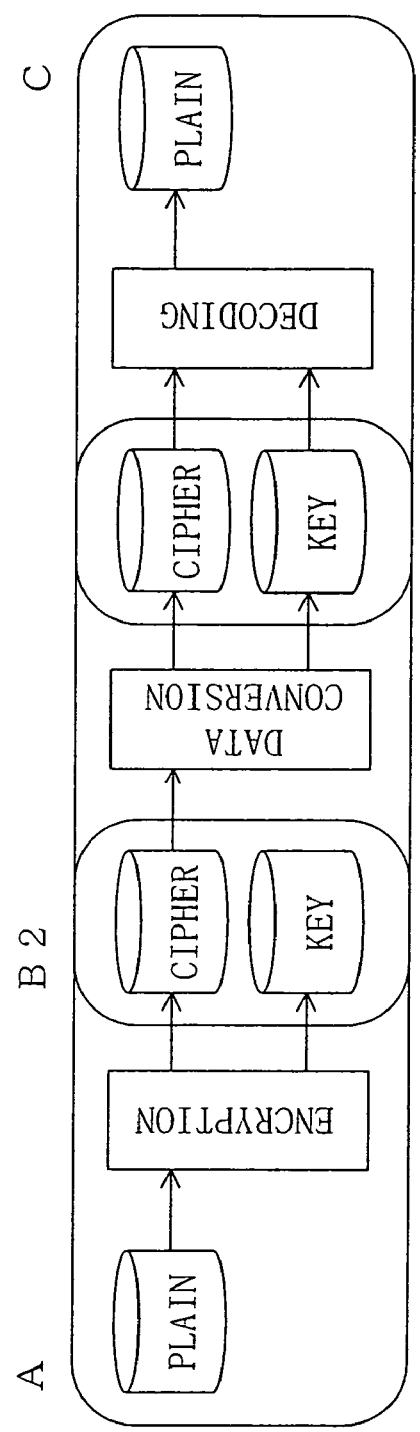

FIGS. 3A and 3B are diagrams each showing a process flow according to the present invention, and show combinations of the basic process patterns of FIGS. 2A to 2D. More specifically, the process shown in FIG. 3A is a combination of encryption A, process B1 of directly processing the encrypted data, and decoding C. For example, the process of FIG. 3A corresponds to the process of encrypting RTL (Register Transfer Level) or behavior-level design data, conducting logic synthesis for the resultant encrypted data so as to output encrypted gate-level design data, and then decoding that data into gate-level design data. This enables confidentiality of the design data to be maintained during the logic synthesis. It is also possible to conduct logic synthesis as well as do the layout for the encrypted data, and then decode the mask data. The process of FIG. 3B is a combination of encryption A, data conversion B2 conducted with ciphers maintained, and decoding C.

Hereinafter, a specific example of each process will be described sequentially.

[Encryption Process]

(Circuit Conversion)

Figure 4:
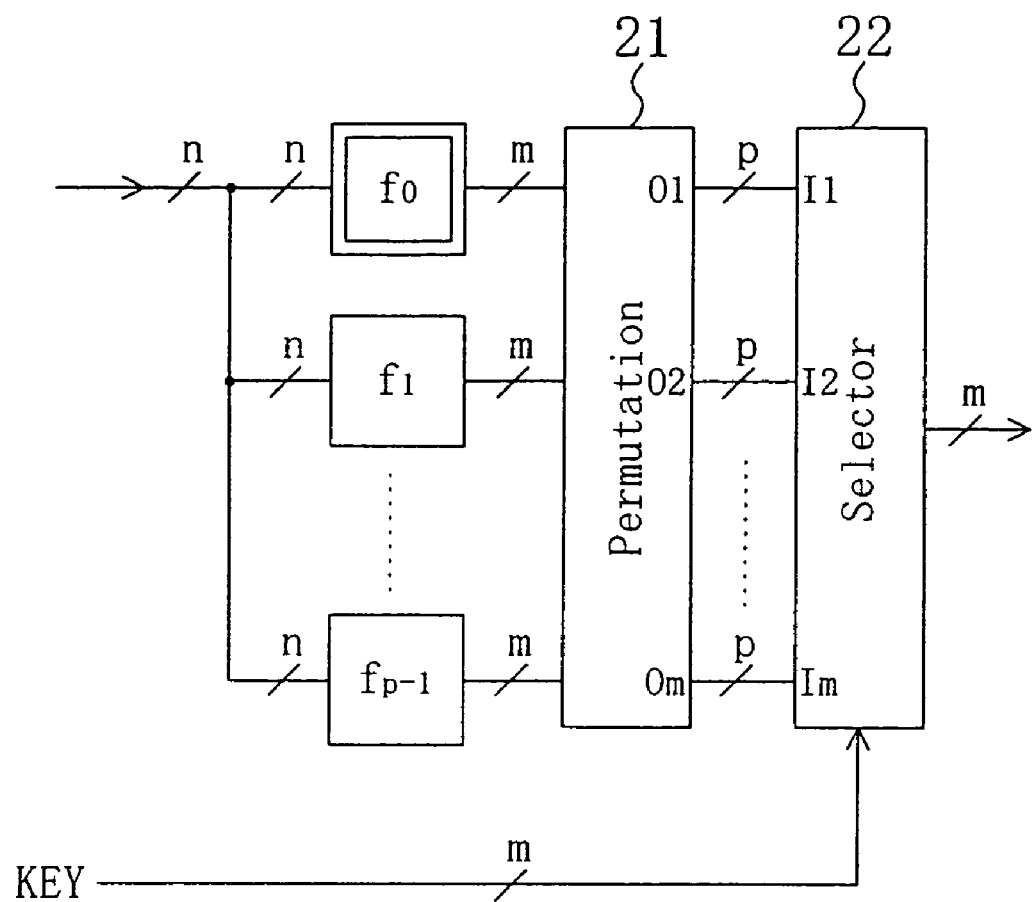
FIG. 4 is a diagram showing circuit conversion according to an example of the encryption process.

FIG. 4 is a diagram showing circuit conversion according to an example of the encryption process of the present invention. In FIG. 4, f0 denotes an original circuit that has not been encrypted. Herein, the circuit f0 has n inputs and m outputs. The circuit f0 may represent the whole original circuit, or may represent a partial circuit of the original circuit.

As shown in FIG. 4, p-1 dummy circuits f1 to fp-1 each having the same number of inputs and the same number of outputs as those of the circuit f0 are provided in parallel with the circuit f0. A permutation circuit 21 and a selector 22 are provided in the subsequent stage. The permutation circuit 21 receives the respective outputs of the circuit f0 and the dummy circuits f1 to fp-1, and permutates the received outputs for output. For example, the permutation circuit 21 collects the respective first bits of the outputs of the circuits f0 to fp-1 and permutates the collected first bits for output from an output O1. The permutation circuit 21 also collects the respective second bits of the outputs of the circuits f0 to fp-1 and permutates the collected second bits for output from an output O2. Thus, the permutation circuit 21 outputs m p-bit signals. The number of output signals from the permutation circuit 21 (i.e., m) corresponds to the number of outputs of the original circuit f0.

According to a selection signal KEY, the selector 22 selects a single bit from each output of the permutation circuit 21 for output. Thus, m signals, which are the same number as that of outputs of the circuit f0, are output from the selector 22. As a result of such circuit conversion, the encrypted circuit as shown in FIG. 4 is produced.

It is herein assumed that the selection signal KEY serves as a key signal of the encrypted circuit, and such a value of the key signal KEY that the output of the circuit f0 matches the output of the selector 22 is a key of the encrypted circuit.

Such encryption by circuit conversion involves simple conversion procedures and also is easy in terms of automatic conversion. Moreover, only the delay in the selector 22 is added as a result of encryption, which is very small.

Figure 5A:
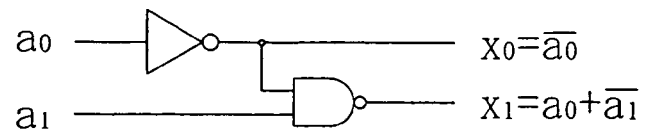
FIGS. 5A to 5D are diagrams showing a specific example of the circuit conversion shown in FIG. 4.
Figure 5B:
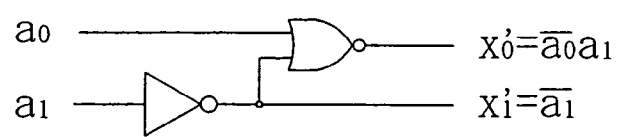
Figure 5C:
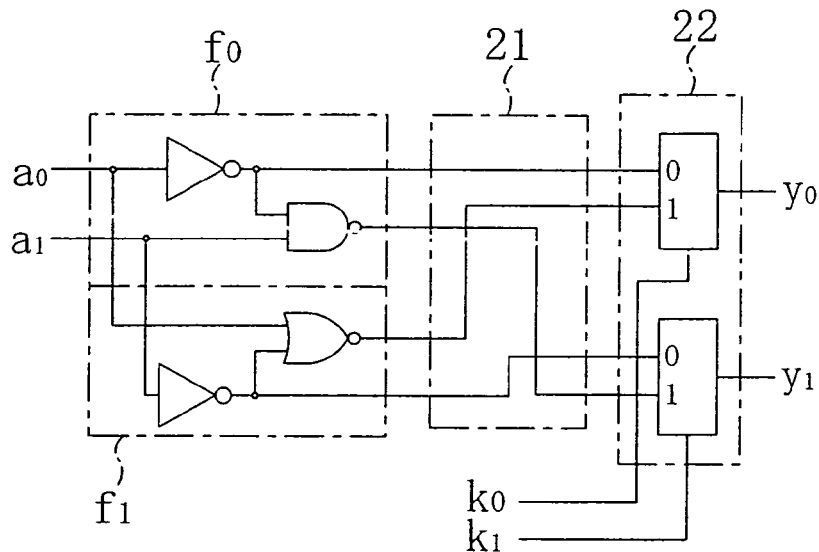
Figure 5D:
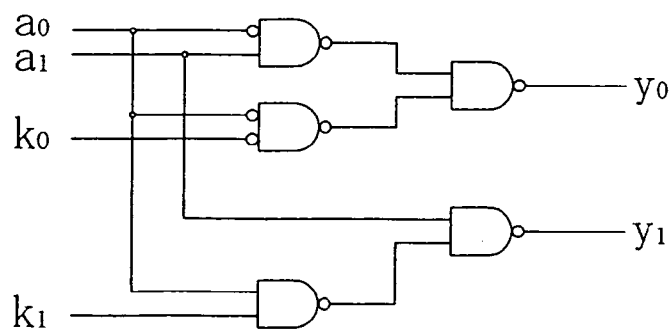

FIGS. 5A to 5D are diagrams showing a specific example of the circuit conversion shown in FIG. 4. It is now assumed that a two-input, two-output circuit as shown in FIG. 5A is provided as the original circuit f0. A dummy circuit f1 as shown in FIG. 5B is provided for this circuit f0. FIG. 5C is a diagram showing the result of encrypting the circuit f0 by using the dummy circuit f1. Furthermore, the circuit of FIG. 5C is synthesized into an encrypted circuit as shown in FIG. 5D. The key of this circuit is (0, 1).

Figure 6:
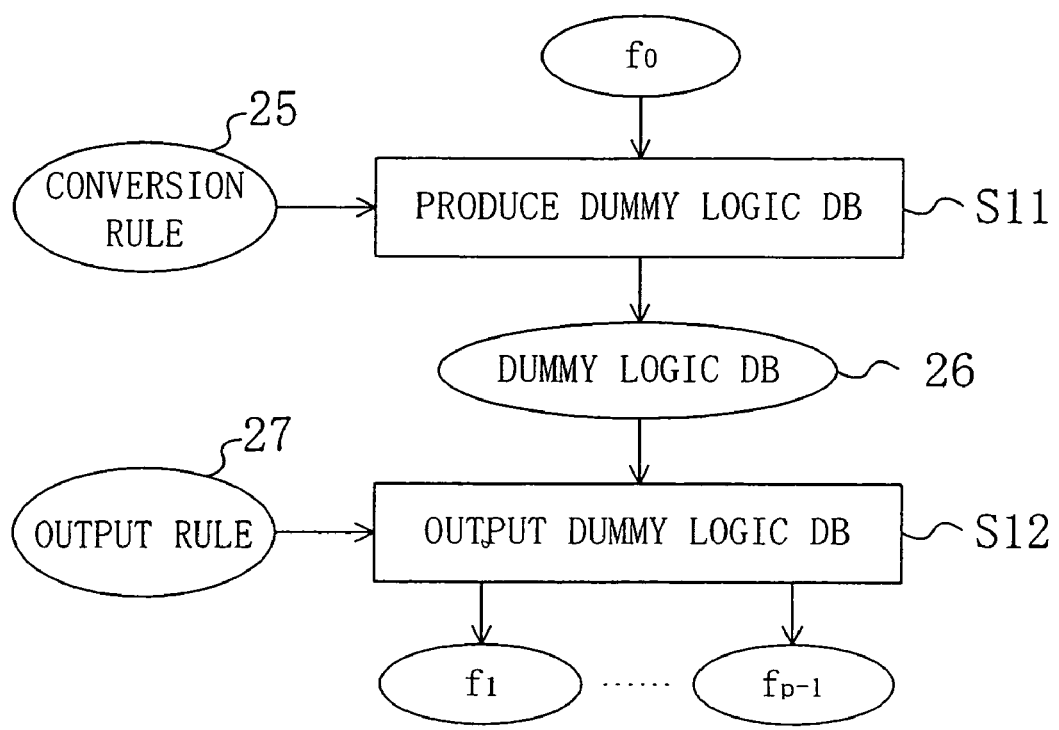
FIG. 6 is a diagram showing a method for producing a dummy circuit used in the circuit conversion shown in FIG. 4.

FIG. 6 is a diagram showing a method for producing a dummy circuit used in the circuit conversion shown in FIG. 4. As shown in FIG. 6, a dummy logic database (DB) 26 including candidate dummy circuits is produced for the original circuit f0 according to a prescribed conversion rule 25. Arbitrary dummy circuits f1 to fp-1 are output from the produced dummy logic DB 26 according to a prescribed output rule 27. Such a producing method is capable of flexibly producing the dummy circuits f1 to f1-p according to the setting of the conversion rule 25 and the output rule 27, and therefore is suitable for an automation process.

Examples of the conversion rule 25 include inversion of a logic value, conversion of a logic operator, permutation of logic operators, and the like. As the inversion of a logic value, inversion of at least one bit of a signal having a plurality of bits is possible in addition to inversion of an input value and inversion of an output value. As the conversion of a logic operator, conversion between AND and OR is possible. Examples of the output rule 27 include random selection, removal of an overlapping dummy circuit, and the like.

[Decoding Process]

The layout of the encrypted circuit resulting from the circuit conversion shown in FIG. 4 is done such that the input signal line of the key signal can be connected to either one of the power supply and the ground. This allows confidentiality of the contents of the original circuit to be maintained until the layout step, and also allows the encrypted circuit to be extremely readily decoded into the original circuit by using a key.

Figure 7A:
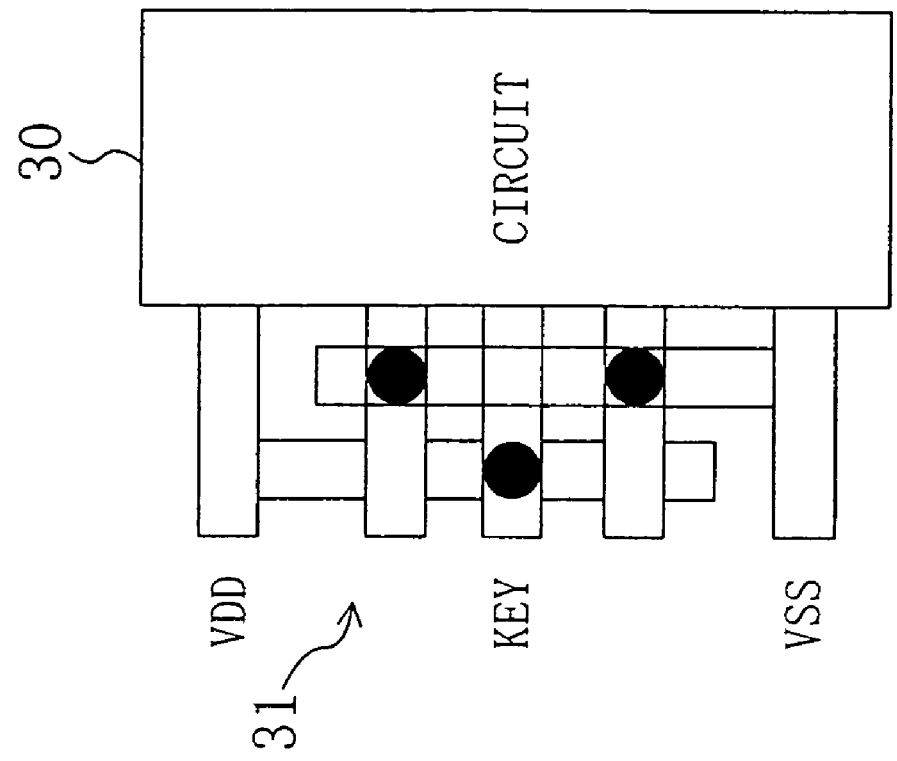
FIGS. 7A and 7B are diagrams illustrating a decoding process.
Figure 7B:
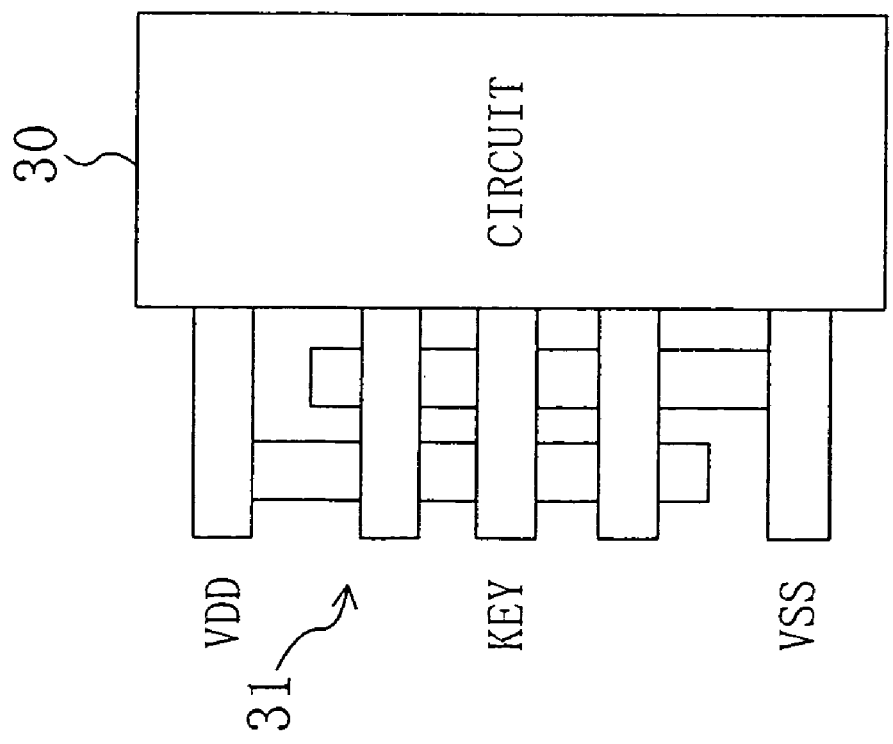

FIGS. 7A and 7B are diagrams illustrating the present decoding process. FIG. 7A shows an example of the layout of the encrypted circuit, and FIG. 7B shows the result of decoding the circuit of FIG. 7A according to a key. As shown in FIG. 7A, the layout is done such that input signal lines 31 of the key signal KEY to be input to the encrypted circuit 30 can be connected to either one of the power supply VDD and the ground VSS. As shown in FIG. 7B, the input signal lines 31 of the key signal KEY are each connected to either the power supply or the ground according to the key ((0, 1, 0) in the example shown in the figure) (ECO (Engineering Change Order)). Thus, the layout of the original circuit is obtained by decoding.

[Design/Verification Process]

(Determination)

When the encrypted design data is decoded for verification by simulation, an expected value for determining whether the simulation result is normal or not is required. However, should the expected value be seen from the outside, the contents of the circuit could be estimated from this expected value, making it impossible to maintain confidentiality of the design data.

Therefore, the circuit design data is encrypted together with the data of the expected value of the simulation result or the original data from which the expected value is obtained. In the verification process, whether the circuit operation is normal or not is determined based on the comparison result between the simulation result and the expected value.

Figure 8:
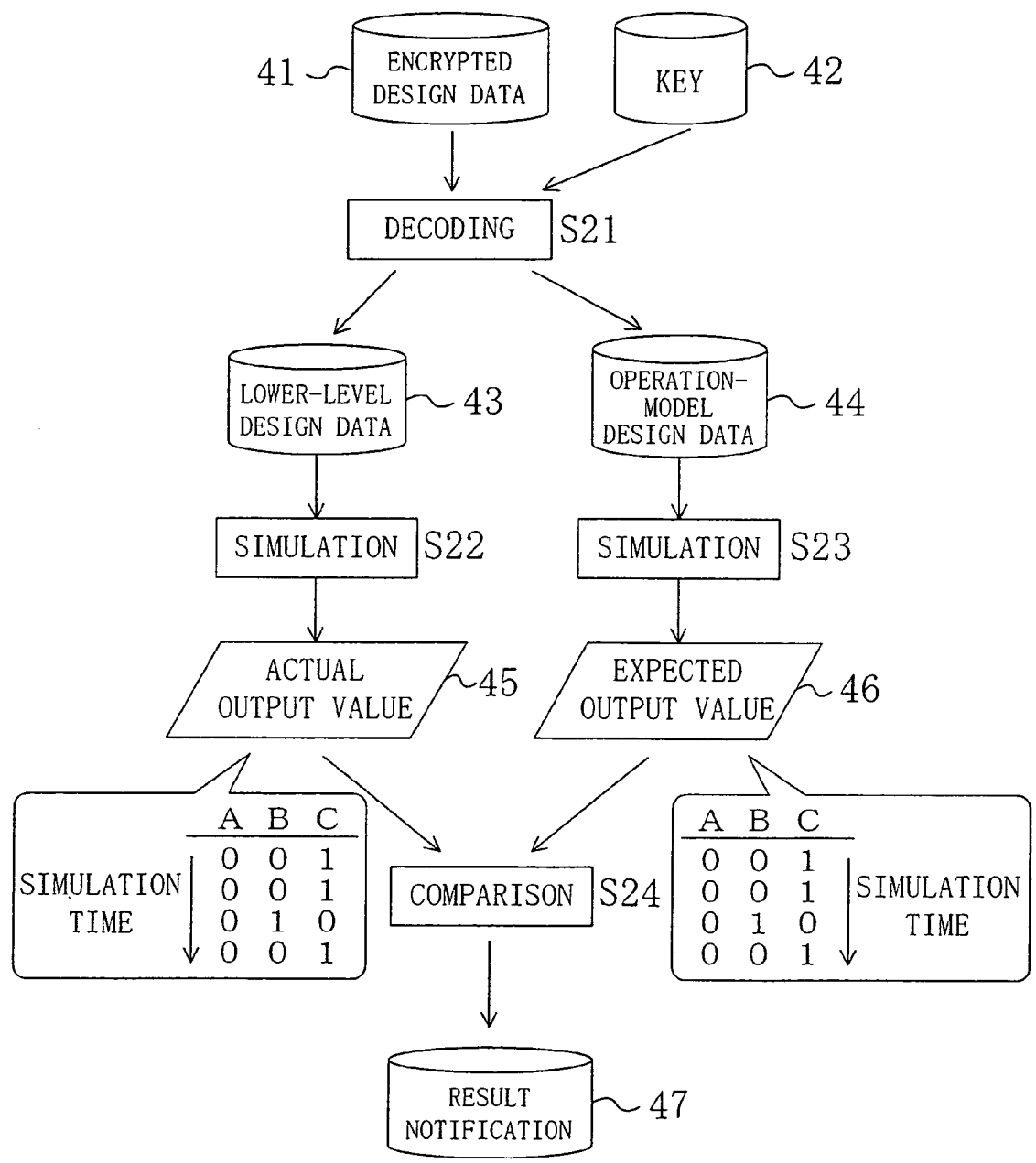
FIG. 8 is a diagram showing a first determination method as a verification process.

FIG. 8 is a diagram showing a first determination method as a verification method according to the present invention. This determination method uses a reference operation model as the original data from which the expected value of the simulation result is obtained. More specifically, as shown in FIG. 8, circuit design data 41 encrypted together with the operation model is first decoded with a key 42 (S21) into actual lower-level design data 43 (RTL or gate-level net listing) and operation-model design data 44. Then, simulation is conducted for the lower-level design data 43 (S22) to obtain an actual output value 45. Simulation is also conducted for the operation-model design data 44 (S23) to obtain an expected output value 46. The actual output value 45 and the expected output value 46 thus obtained are compared with each other in order to determine whether or not the actual output value 45 matches the expected output value 46 at each simulation time (S24). In the example of FIG. 8, the values match each other. Therefore, result notification 47 is output, notifying that the simulation result is normal.

Figure 9:
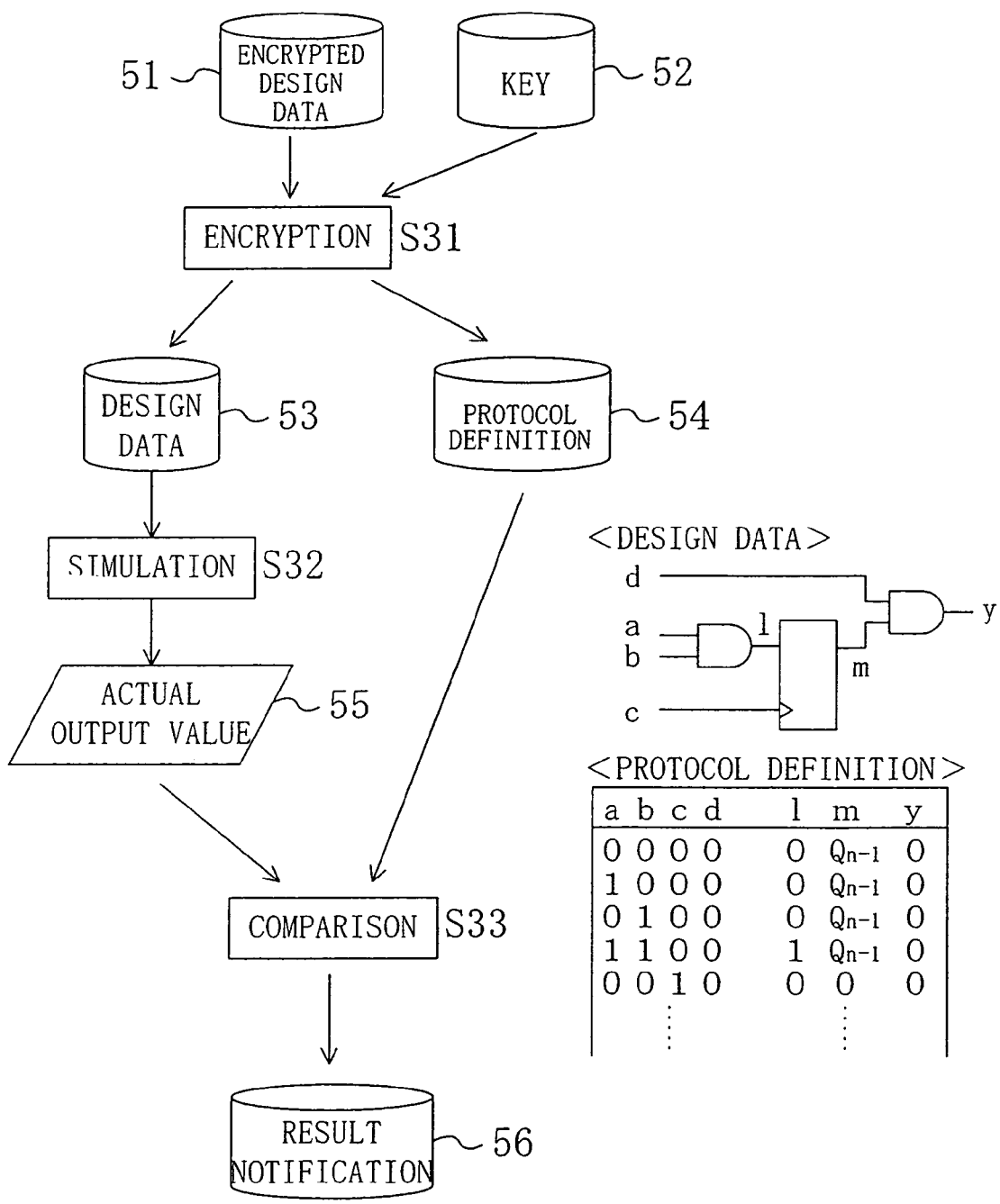
FIG. 9 is a diagram showing a second determination method as a verification process.

FIG. 9 is a diagram showing a second determination method as a verification method according to the present invention. This determination method uses protocol definition as the data of the expected value of the simulation result. More specifically, as shown in FIG. 9, circuit design data 51 encrypted together with the protocol definition is decoded with a key 52 (S31) into design data 53 and protocol definition 54. The protocol definition 54 defines an operation state of the circuit indicated by the design data 53, regarding the input/output values and intermediate node values of the circuit. Then, simulation is conducted for the design data 53 (S32), and the resultant actual output value 55 is compared with the protocol definition 54 (S33).

Note that, in the first and second determination methods, if the result of the method shows that the simulation result is abnormal, the respective actual output value 45, 55, i.e., the simulation execution result, may be encrypted for output.

(Limitation on Simulation)

In the case where simulation is conducted for the encrypted design data for the purpose of verification, the verification result output includes information on all signal lines contained in the design data. Providing a large number of inputs for simulation and analyzing the resultant verification result output allows the contents of the encrypted circuit to be known.

Herein is shown a method for limiting the simulation so as to prevent the contents of the circuit from being known from the verification result output, that is, so as to monitor for and prevent unauthorized access.

Figure 10:
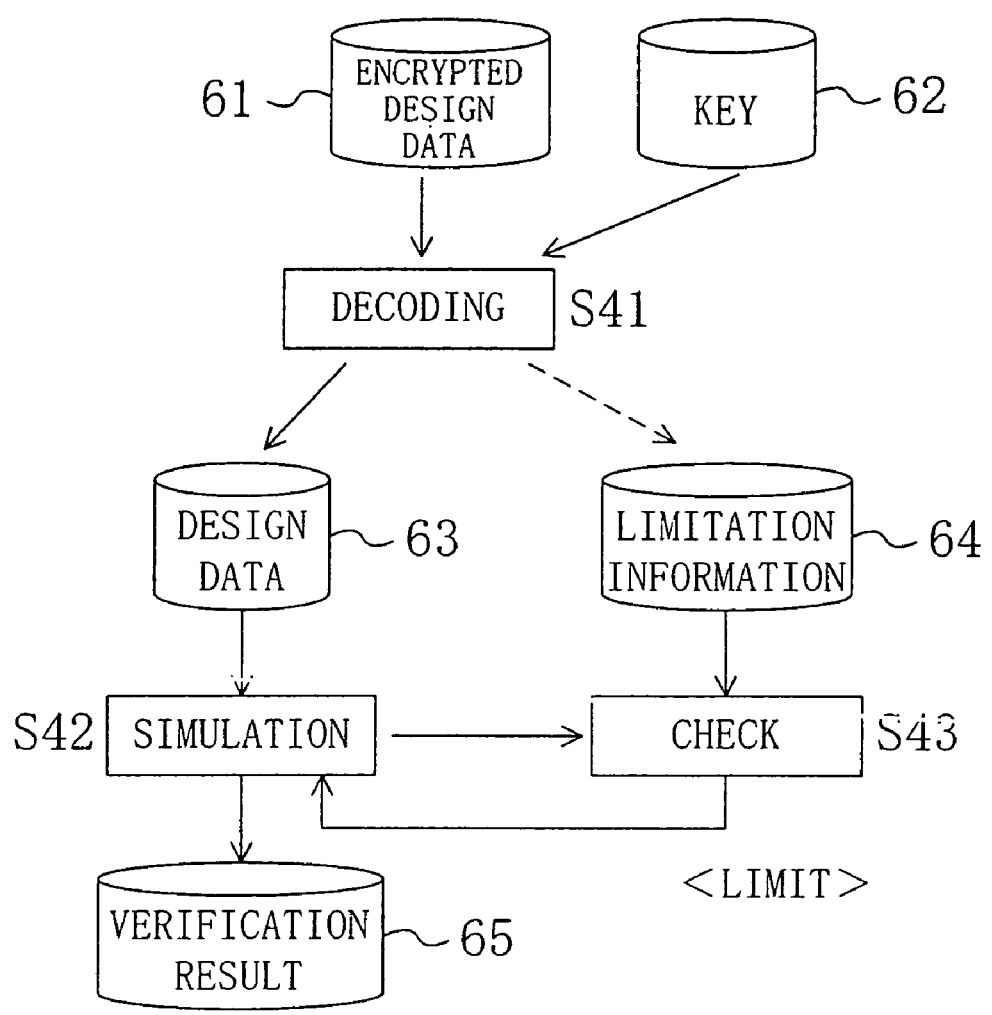
FIG. 10 is a diagram showing a simulation limiting method as a verification process.

FIG. 10 is a diagram showing a simulation limiting method as a verification method according to the present invention. As shown in FIG. 10, in checking S43 of simulation S42, prescribed limitation information 64 is counted during the simulation. When the count value exceeds a prescribed upper limit, the simulation S42 is limited. Examples of the prescribed limitation information 64 include:

execution steps and execution time of the simulation;

the number of toggles of a specific signal within the circuit; and combination of inputs to the circuit.

The above limitation information may be randomly selected. Examples of the method for limiting the simulation include:

discontinuing the simulation, reducing the simulation execution speed, and executing the simulation in an abnormal manner;

outputting no simulation result;

discontinuing outputting of data such as dump information of each signal line and determination result; and producing no data or key to be passed to the following step.

A protocol restriction condition may be provided as the limitation information 64 so as to determine in the simulation whether the protocol restriction condition is violated or not. Examples of the protocol restriction condition include:

a protocol allowable in input to the circuit (input protocol); and a protocol allowable in operation within the circuit (in-operation protocol).

These protocol restriction conditions may be randomly selected.

Note that the limitation information 64 may be encrypted together with the circuit design data so as to be decoded, or may be provided separately from the encrypted design data 61.

A circuit for checking for unauthorized access in the simulation may be included in advance in the circuit design data for encryption. This check circuit must be configured such that it operates only during the simulation and that the operation thereof is disabled after designing the circuit.

Figures 11A, 11B:
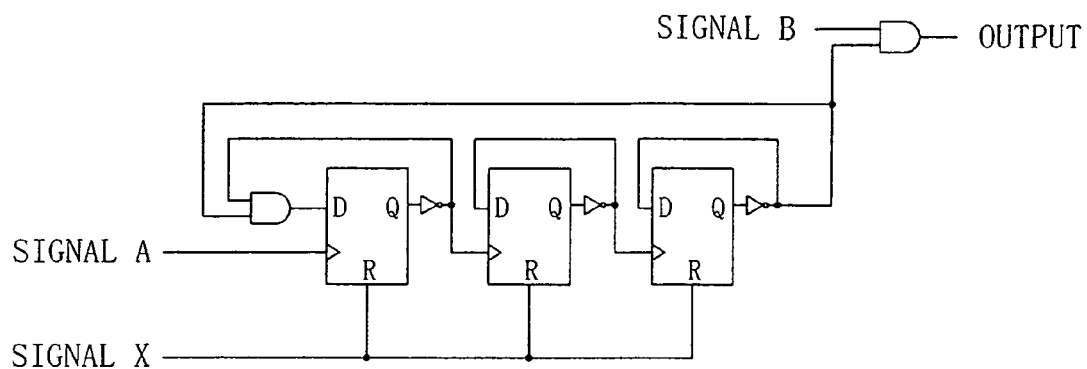
FIGS. 11A and 11B are diagrams showing an example of a check circuit.

FIGS. 11A and 11B are diagrams showing an example of the circuit for checking for unauthorized access in the simulation. The check circuit shown in FIG. 11A fixes its output value to "0" regardless of the value of a signal B, when the number of times a signal A changes exceeds a prescribed value ("8" in this example). In the simulation, "1"→"0" is provided to a signal X for external reset. Thereafter, as shown in FIG. 11B, the output value matches the value of the signal B until the number of times the signal A changes, i.e., the prescribed limitation information, exceeds eight. However, when the number of times the signal A changes exceeds eight, the output value is fixed to "0". This prevents a correct simulation result from being obtained. In manufacturing the circuit, the signal X is fixed to "1" in order to prevent the check circuit from operating.

Figures 12A, 12B:
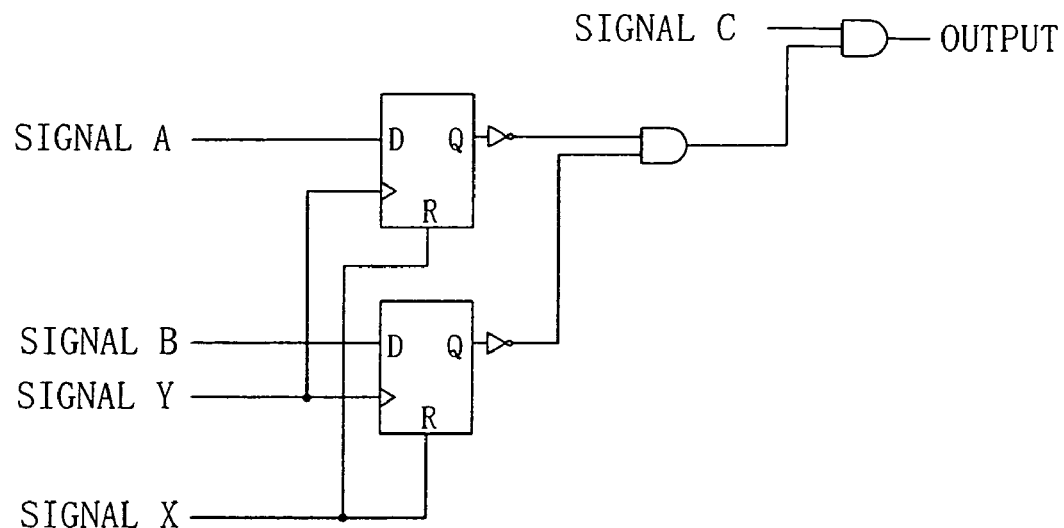
FIGS. 12A and 12B are diagrams showing an example of a check circuit.

FIGS. 12A and 12B are diagrams showing another example of the check circuit. The protocol restriction condition for the check circuit of FIG. 12A is that the signals A, B are both "0" while a signal Y is changing. Therefore, if one of the signals A, B is not "0" while the signal Y is changing, it is recognized that the protocol is violated, whereby the output value is fixed to "0" regardless of the value of a signal C. In the simulation, "1"→"0" is provided to the signal X for external reset. Thereafter, as shown in FIG. 12B, if both the signals A and B are not "0" while the signal Y is changing, the output value is fixed to "0". This prevents a correct simulation result from being obtained. In manufacturing the circuit, the signal x is fixed to "1" as well as the signal Y is fixed to "0" in order to prevent the check circuit from operating.

(Timing Adjustment)

FIGS. 13 and FIGS. 14A to 14D are diagrams showing a timing adjustment method as an LSI design method according to the present invention. This timing adjustment method includes the flow shown in FIG. 3A, i.e., the flow of encryption A, process B1 and decoding C.

Figure 13:
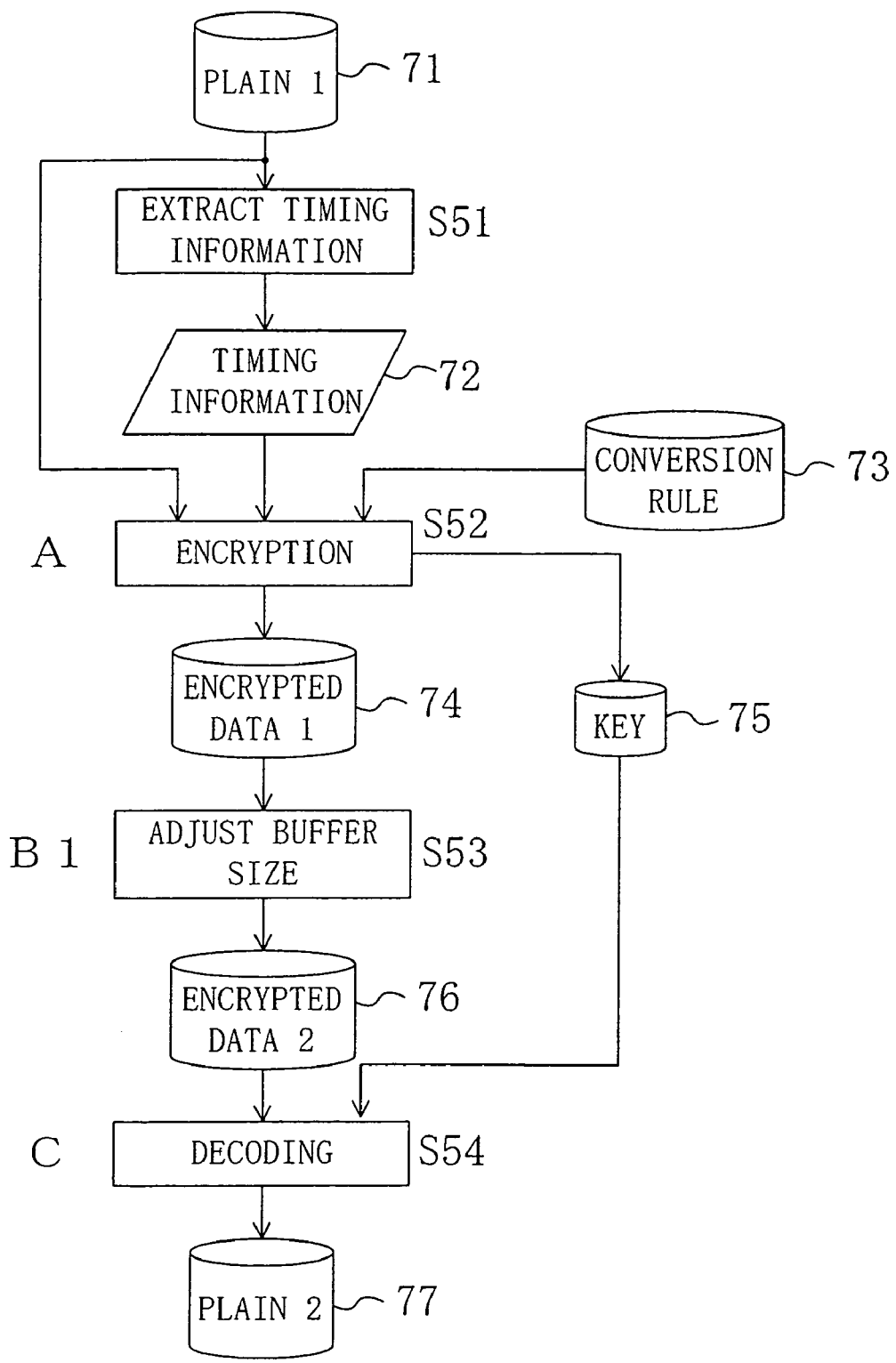
FIG. 13 is a diagram showing a timing adjustment method.
Figure 14A:
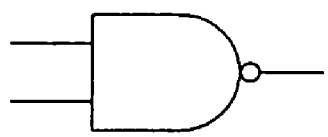
FIGS. 14A to 14D are diagrams showing a timing adjustment method.
Figure 14B:
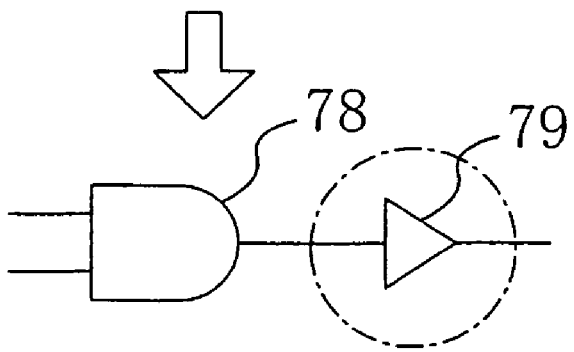

As shown in FIG. 13, timing information 72 is first extracted from original circuit design data 71 (S51). The timing information as used herein refers to a delay from each logic gate to a load of the location to which the logic gate is connected. According to a prescribed conversion rule 73, the encryption process is conducted (S52) so as to prevent the contents of the original circuit from being known as well as to match only the timing information 72, i.e., without changing the delay from each logic gate to the load at the location to which the logic gate is connected. Thus, encrypted design data 74 is produced. The contents of the conversion rule 73 are directly used as a key 75. At this time, as shown in FIGS. 14A and 14B, a buffer 79 for timing adjustment is added to at least one of the converted logic gates 78.

Figure 14C:
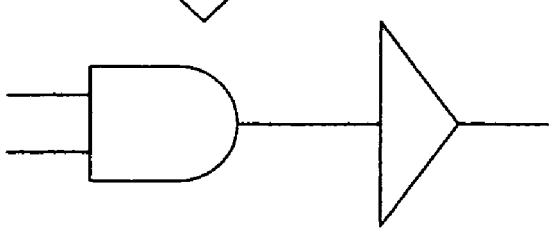
Figure 14D:
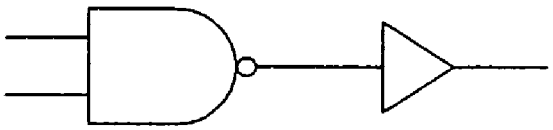

For the encrypted design data 74, the size of the added buffer 79 is adjusted so as to satisfy the target timing (S53), as shown in FIG. 14C. Herein, the key 75 produced in the encryption process S52 need not be used. After adjusting the buffer size, the resultant encrypted design data 76 is decoded the key 75, i.e., the prescribed conversion rule (S54), whereby the original circuit 77 is obtained. At this time, as shown in FIG. 14D, the logic gate is converted into an original logic gate based on the adjusted buffer size. As a result, the target timing is achieved.

According to such a timing adjustment method, timing adjustment can be conducted while concealing the contents of the circuit from the designer.

(Production of Unique ID)

Figure 15:
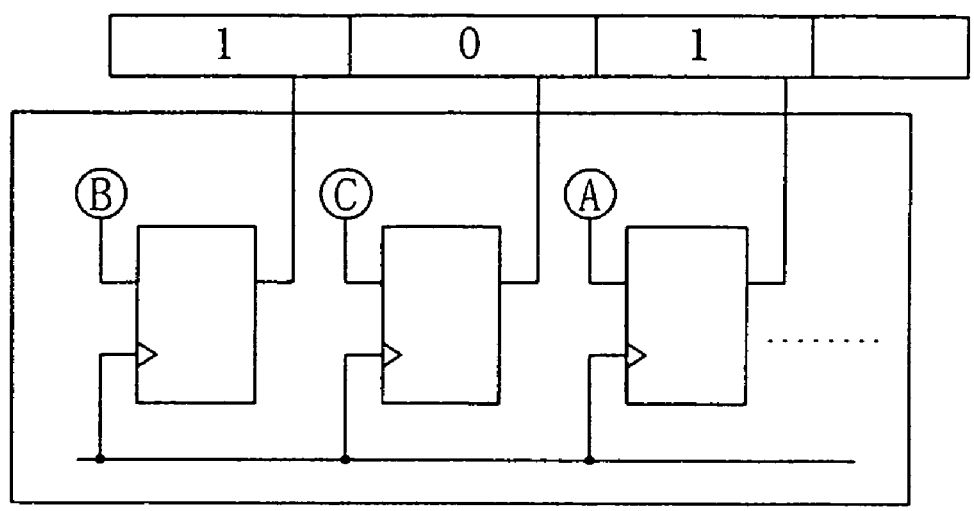
FIG. 15 is a diagram showing an example of the circuit structure represented by encrypted design data.

FIG. 15 is a diagram showing an example of the circuit structure represented by the encrypted design data. As shown in FIG. 15, the encrypted design data has a circuit unique ID register as a unique-ID determination circuit for determining the type of the product. A value of the unique ID to be input to the circuit unique ID register is defined by a variable. A unique parameter that provides a value of the variable of the unique ID is also defined. The unique parameter is defined in the arrangement different from that of the actual unique ID.

Even when the simulation is conducted with the input unique ID value being set to "110", the arrangement thereof is different from that of the value of the circuit unique ID register. In the simulation, a normally operating circuit is not produced until a unique ID value re-defined as "101" matches the unique ID of the circuit. In the following design step, even when the input unique ID value is set to "011", it is re-defined as "101".

Note that although each of the unique ID and the input unique ID herein has a three-bit value, these values may have any number of bits. The input unique ID and the circuit unique ID register may be inverted from each other not only in terms of the arrangement but also the logic.

Figure 16:
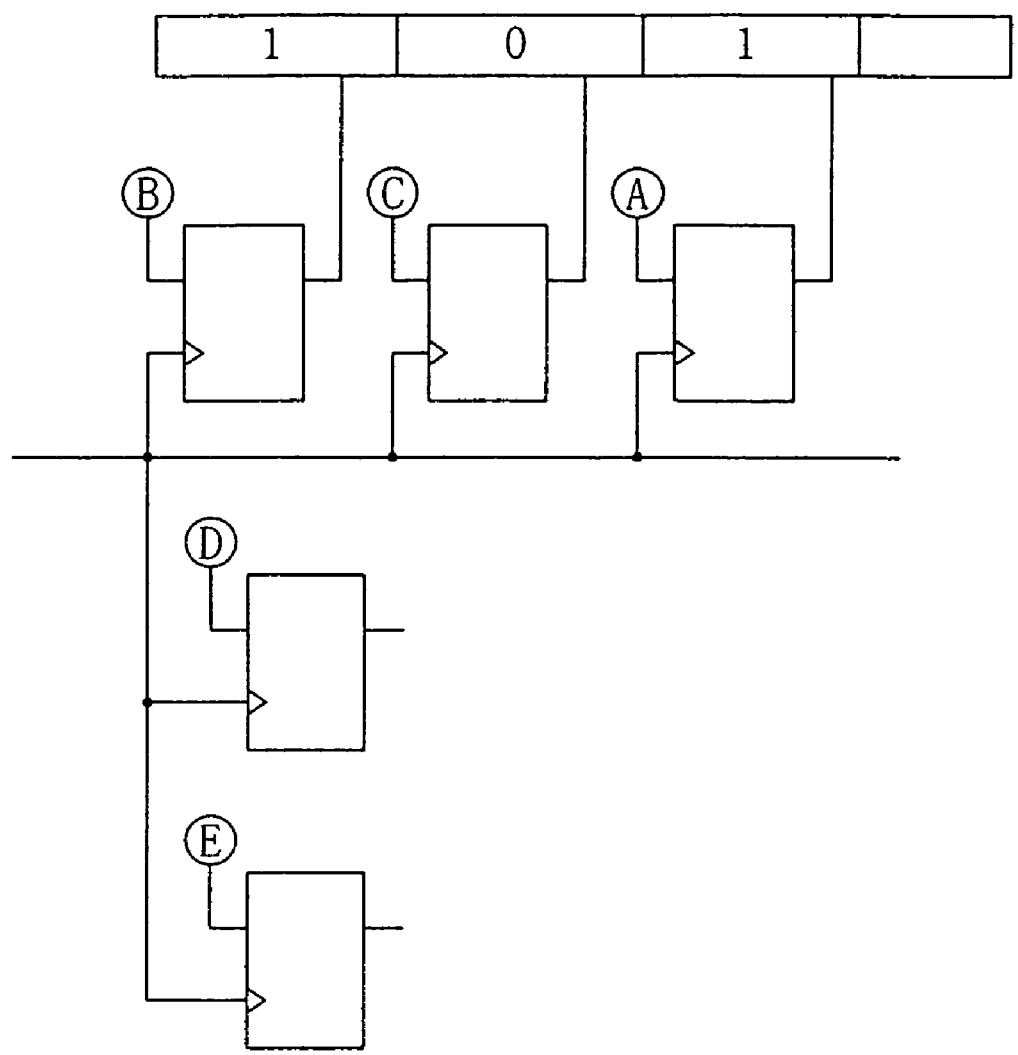
FIG. 16 is a diagram showing an example of the circuit structure represented by encrypted design data.

In the circuit of FIG. 16, not only the unique ID but also every node in the logic circuit that is fixed to the power supply or the ground is defined by a variable.

The unique ID value and the other values fixed for normal operation are each input as a variable. Therefore, the circuit unique-ID registers (A, B and C in the figure) cannot be distinguished from the other registers (D and E in the figure) on the circuit, making it difficult to know the unique ID value.

Note that each of the aforementioned methods can be implemented by an apparatus including a computer for executing a program for implementing the method. The program for implementing the method may be recorded on a computer-readable recording medium, so that the method can be implemented by executing the program recorded on the recording medium by the computer.

As has been described above, the present invention allows improved confidentiality of circuit design data over the conventional examples by using encryption. The present invention also enables the encrypted circuit design data to be designed and verified while maintaining confidentiality thereof.

What is claimed is:

1. A method for designing an LSI, comprising the step of encrypting provided circuit design data,
   wherein the encrypting step includes the step of conducting circuit conversion to produce an encrypted circuit, the circuit conversion being conducted using an entire circuit represented by the circuit design data or a part of the circuit as an original circuit,
   the circuit conversion step includes the steps of
      providing at least one dummy circuit in parallel with the original circuit, the dummy circuit having a same number of inputs and a same number of outputs as those of the original circuit,
      providing a permutation circuit for permutating respective outputs of the original circuit and the dummy circuit, and
      providing a selector responsive to a selection signal for selecting a number of signals corresponding to the number of outputs of the original circuit from an output of the permutation circuit so as to produce the encrypted circuit, wherein the selection signal is used as a key signal, and such a value of the key signal that the output of the original circuit matches an output of the selector is used as a key of the encrypted circuit.

2. The method according to claim 1, wherein the encrypting step includes the step of producing the dummy circuit to be used in the circuit conversion step, and
   the dummy circuit producing step includes
      the steps of producing a dummy logic database for the original circuit according to a conversion rule, the dummy logic database including candidate dummy circuits, and
   selecting the dummy circuit from the dummy logic database according to an output rule.

3. The method according to claim 2, wherein the conversion rule includes at least one of inversion of a logic value, conversion of a logic operator, and permutation of logic operators.

4. The method according to claim 2, wherein the output rule is random selection.

5. The method according to claim 1, further comprising the step of conducting layout of the encrypted circuit, the layout step including the step of conducting the layout such that an input signal line of the key signal can be connected to either one of a power supply and a ground.

6. The method according to claim 5, wherein the layout step includes the step of connecting the key signal to one of the power supply and the ground according to the key so as to produce layout of the original circuit.

* * * * *